Patented Apr. 17, 1945

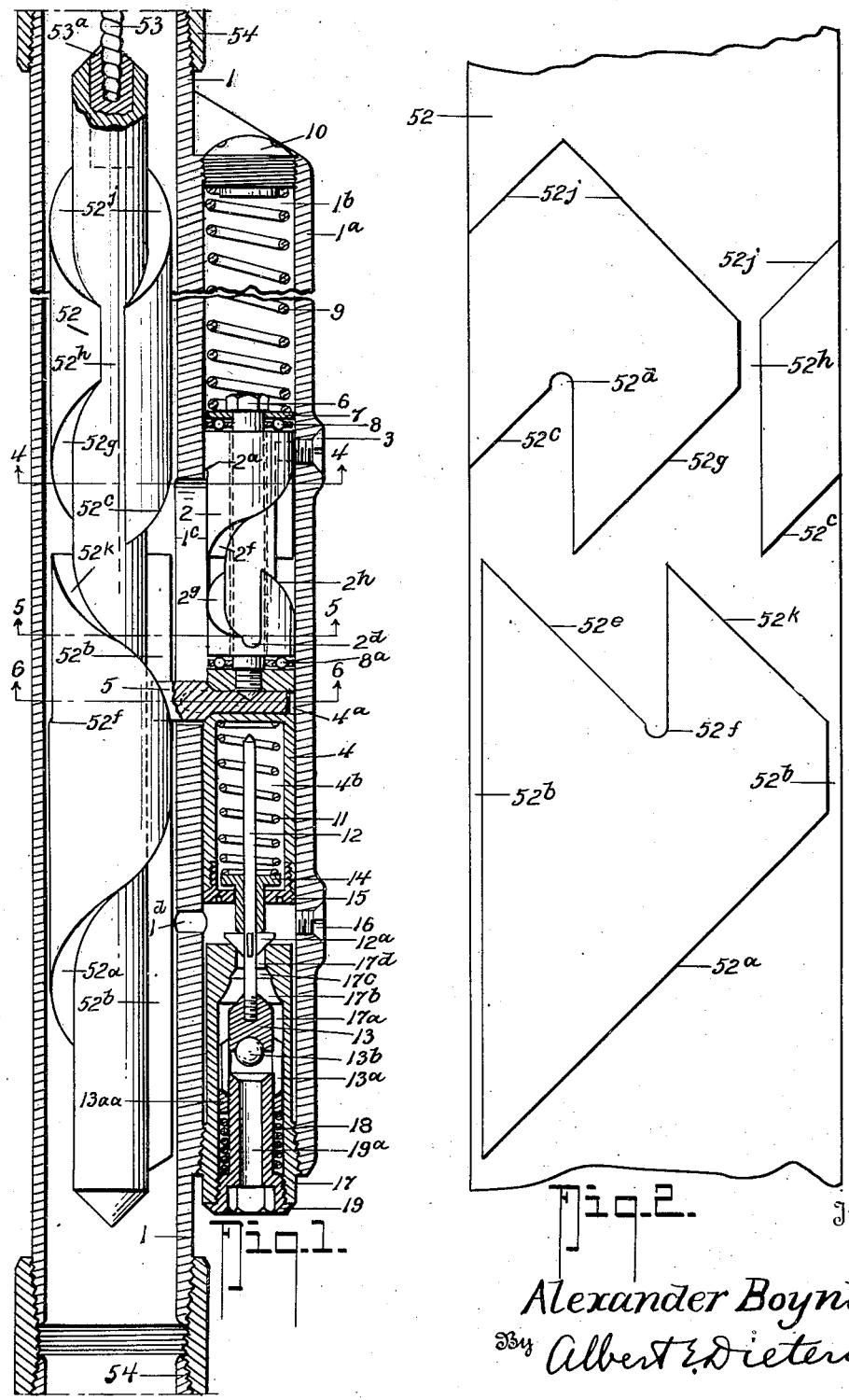

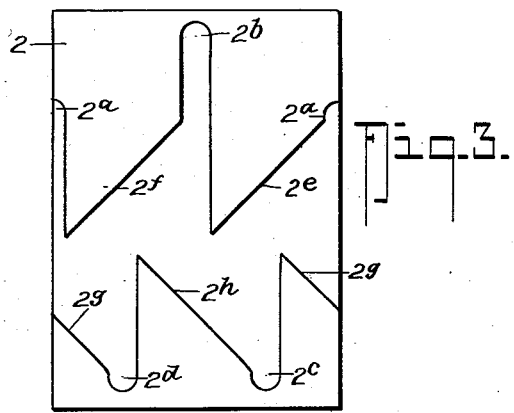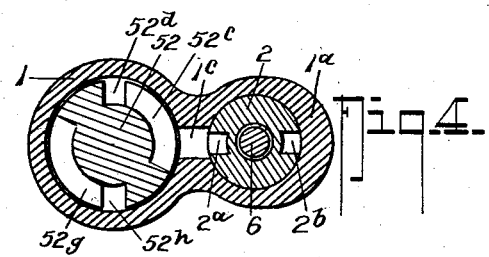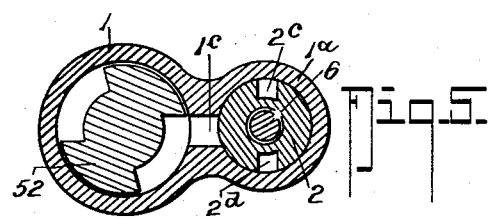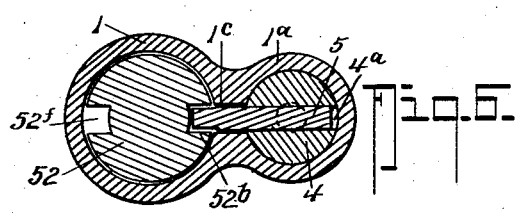

2,373,647

UNITED STATES PATENT OFFICE 2,373,647

REMOTELY CONTROLLED FLOW VALVE OPERATING TOOL

Alexander Boynton, San Antonio, Tex.; Sida S. Martin executrix of said Alexander Boynton, deceased Original application December 6, 1941, Serial No. 421,934. Divided and this application May 21, 1943, Serial No. 487,940

4 Claims. (Cl. 81—3)

My invention has for its object to provide a tool for use in operating remotely controlled flow valves for wells, such valves, for instance, as those disclosed in my applications filed December 6, 1941, Serial Numbers 421,934 and 421,935.

In the drawings,

Fig. 1 is mainly a longitudinal section through a preferred embodiment of a device employing my present invention and showing the pressure fluid intake valve open with the releasing connection and portions of the device in elevation.

Fig. 2 is a diagrammatic view of the slots, pockets, and helically inclined cam surfaces of the tool.

Fig. 3 is a diagram of the slots, pockets, and helically inclined cam surfaces of the actuator.

Fig. 4 is a cross section on the line 4—4 of Fig. 1.

Fig. 5 is a cross section on the line 5—5 of Fig. 1.

Fig. 6 is a cross section on the line 6—6 of Fig. 1.

Similar reference characters are employed to designate similar parts in all the figures.

In Fig. 1, the nipple 1, having the lateral slot 1c and the pressure fluid intake port 1d, is adapted to be connected at intervals into the eduction tubing 54 of a well. The lateral shell 1a, which may be cast of steel integrally with the nipple 1, has the smooth bore 1b within which the actuator 2 and the actuator pin housing 4 are slidable. The housing 4 has the cross bore 4a which closely receives the actuator pin 5, having a head slidable within the slot 1c of the nipple 1 and extending a short distance, such as one-fourth inch, within the axial passage through the nipple. The guide pin 3 is secured firmly in the shell 1a and extends thereinto far enough to be engaged within and upon the pin pockets and inclined cam surfaces of the actuator, as will appear further on.

The axle bolt 6 is received with slight clearance within an axial opening through the cylindrical actuator 2 and has threaded engagement with the housing 4. The pointed lower end of this bolt engages within a conical depression on the actuator pin 5, whereby the pin is secured firmly within the housing 4. A washer 7 is engaged under the head of the bolt 6 and upon the thrust bearing 8 which urges the actuator downward by force of the actuator spring 9, having slight clearance around it and being confined within the bore 1b by the plug 10 employed to close the upper end of the shell 1a. The thrust bearing 8a is confined between the actuator 2 and the housing 4, and the thrust bearing 8 is confined between the actuator 2 and the washer 7, the head of the bolt 6 having slight clearance with the washer 7, in order that the bearings 8 and 8a will be free.

A differential spring 11, free within the axial chamber 4b of the housing 4, is confined therein by the spring support 15 secured to said housing. The sleeve 14, slidable within the spring support 15, has its head engaged between this support and the differential spring 11. The plunger chamber sleeve 17, secured within the shell 1a, has formed within it the plunger chamber 17a, the metering chamber 17b, the axial pressure fluid passage 17d, and the closure seat 17c formed around the lower end of the passage 17d. The plunger 13, having its upper end formed into a valve engageable with the seat 17c, has proper clearance around it for pressure fluid and has the fins 13a engaged upon the slidable ring 13aa which in turn engages the plunger seating spring 18 which spring is secured within the lower portion of the chamber 17a by the intake nipple 19 having the intake passage 19a and being threadedly engaged within the lower end of the sleeve 17. This nipple protects the spring 18 from the corrosive action of pressure fluid entering the device through the intake passage 19a. The screw 16 is employed to close the opening made in drilling the port 1d.

The plunger rod 12, secured to the plunger 13, has the arms 12a adapted to engage upon the sleeve 17, in order to position the plunger in spaced relation to the seat 17c when the device is open to intake pressure fluid, as in Fig. 1. The upper end of the rod 12 is slidable through the sleeve 14 and the fins 13a of the plunger are slidable within the chamber 17a for the purpose of guiding the plunger to concentrically engage the seat 17c and thereby close the path of pressure fluid through the device during high differentials. The differential spring 11 transmitting its force through sleeve 14 resiliently urges the plunger 13 away from its seat 17c when the guide pin 3 is engaged within the deep upper pin pocket 2b, as appears in Fig. 1, and the spring 18 resiliently urges the plunger to engage that seat when the pin 3 is engaged within the shallow upper pin pocket 2a.

The check valve 12b, formed to be partially received within the lower end of the plunger 13, is adapted to be forced upward, as appears in Fig. 1, while the device is intaking pressure fluid. This valve is adapted also to engage a seat formed upon the upper end of the intake nipple 19 when the device is not intaking pressure fluid.

The actuator assembly is adapted to become stationary in two positions. One of these positions is when the guide pin 3 is contained in the deep pin pocket 2b, this being the open position of the device, as in Fig. 1. The other stationary position of the actuator is when the pin 3 is engaged within the shallow pin pocket 2a, this being the closed position of the device. The actuator spring 9 constantly urges the actuator downward toward one of these positions.

It will be observed in Fig. 3 that the upper pin pockets and helically inclined cam surfaces are rotatably offset with relation to the position of the lower pin pockets and helically inclined cam surfaces; that is, the shallow upper pin pocket 2a is opposed by the lower helically inclined cam surface 2g; the deep upper pin pocket 2b is opposed by the lower helically inclined cam surface 2h; the lower pin pocket 2c is opposed by the upper helically inclined cam surface 2e; and the lower pin pocket 2d is opposed by the upper helically inclined cam surface 2f.

The inclined cam surfaces 2e, 2f, 2g, and 2h, and the lower pin pockets 2c and 2d manipulate the actuator in its various contacts with the guide pin 3, as will later be explained.

Subsurface installation

By way of illustrating the best presently known mode of applying the invention, it will be understood that the devices disclosed may be installed in series at spaced intervals in the eduction tubing 54 of a well. The distance between proximate devices may be, for example, 200 to 500 feet. Any desired number of devices may be employed, series of three to seven being adapted to meet the most ordinary well conditions.

Operation

Each vertical movement of the actuator is caused by a cable pull upon the actuator pin or by the actuator spring thereafter forcing the actuator in the opposite direction. All rotational movements of the actuator are caused by the stationary guide pin acted upon by the helically inclined cam surfaces of the actuator during its vertical movements. The vertical and rotary movements of the actuator are coincidental. Whenever the actuator is pulled upward, one of the lower inclined cam surfaces contacts the guide pin to cause partial rotation of the actuator. Whenever the actuator is forced downward by the actuator spring, one of the upper inclined cam surfaces contacts the guide pin to cause continued limited rotation of the actuator.

The path of pressure fluid through the open device and into the tubing 54 is via the intake passage 19a, the plunger chamber 17a, the pressure fluid passage 17d, and the pressure fluid intake port 1d, in the order named.

The actuator pin 5, which extends slightly into the flow passage through the nipple, is adapted to be releasably engaged by the operating tool 52, Fig. 1, in a manner to be described further on.

To close the device, it being open, as in Fig. 1 wherein the guide pin 3 is engaged within the deep upper pocket 2b, proceed as follows: Attach the operating tool 52 to the actuator pin 5 and pull the actuator 2 upward. The lower inclined cam surface 2h will contact the guide pin 3 and will cause the actuator to be rotated slightly until this pin will be engaged within the lower pocket 2c. Then, release the pull upon the actuator pin 5; whereupon the actuator spring 9 will force the actuator downward, causing the upper inclined cam surface 2e to contact the pin 3; whereby the actuator will be rotated further until shallow upper pocket 2a will contain the pin 3. In this position pressure fluid during relatively high differentials urges the plunger 13 against the valve seat 17c, thereby cutting off the flow of pressure fluid. The upper position of the sleeve 14 removes restraint of this upward movement of the plunger 13.

To open the device, it being closed, the guide pin 3 being engaged within the shallow upper pocket 2a, proceed as follows: Attach the operating tool 52 to the actuator pin 5 and pull the actuator 2 upward. The lower inclined cam surface 2g will engage the guide pin 3 and cause the actuator to be rotated slightly until this pin will be engaged within the lower pocket 2d. Then, release the pull upon the actuator pin 5; whereupon the spring 9 will force the actuator downward, causing the upper inclined cam surface 2f to contact the pin 3; whereby the actuator will be rotated further until the deep upper pocket 2b will contain the pin 3 again, as in Fig. 1. In this position the sleeve 14 limits upward movement of the plunger 13. Thus this plunger cannot engage the seat 17c under the influence of pressure fluid and the passage for pressure fluid is kept open.

It will be understood that the differential spring 11 will be stronger than the plunger seating spring 18 when the spring 11 is compressed as in Fig. 1. When the device is open, the spring 11 compresses the spring 18. When the device is closed the spring 18 forces the plunger to engage the closure seat 17c to stop the flow of pressure fluid through the passage 17d after the spring 11 has been raised and the sleeve 14 has been removed from contact with the arms 12a of the plunger rod 12.

Manifestly the spring 18 can be moved into the chamber 4b and given proper contact means with the upper end of the rod 12 to lift the plunger so as to close the passage 17d when the actuator is raised.

When the device is open, as in Fig. 1, high differentials will cause the plunger 13 to close upon the seat 17c and cut off the flow of pressure fluid into the device. For example, if a pressure fluid differential of 100 pounds in the plunger chamber 17a will seat the plunger, it is apparent that the device will close its intake whenever there is less than 100 pounds of load in the tubing above the open device, and that the pressure fluid inlet will open again whenever a load of more than 100 pounds reappears in the tubing above the open device.

When the device is closed it is obvious that the force of the spring 18 is aided by the differential force in causing the plunger 13 to remain firmly engaged upon its seat 17c.

If, between flowing operations, however, well liquid entrapped within the tubing by a check valve therein should outweigh the pressure fluid force exterior of any device, the check valve 13b will prevent the escape of liquid through such device.

The operating tool

This tool, which constitutes the subject matter of the present invention, comprises a series of slots, pockets, and helically inclined cam surfaces formed upon the surface of a one piece rod or shaft-like member most plainly appearing in Figs. 1 and 2. It may be lowered into the tubing 54 by means of the cable 53 upon which it is shown secured by the lead, solder or babbitt 53a.

The operating tool, free to be rotated, thereby slightly twisting the proximate portion of the cable with it, is shunted axially by its inclined surfaces contacting the actuator pin 5, whereby the tool, as it is reciprocated, alternately engages and releases this pin. After each pull upon the pin, the tool may be lowered through the device and then withdrawn from the well or it may be lowered to the next device for similar action.

The outstanding operative characteristic of the tool 52 is as follows: It will land upon each device upon which it is lowered. Then one pull upon the tool will open the device if closed or close the device if open. The tool then may be lowered through the device which has last been pulled upon, after which it may be either raised out of the well or lowered to the next device to open it if closed or to close it if open, as was stated for the action of the tool upon the valve above.

When the tool 52 encounters the actuator pin 5, the lower guide slope or cam surface 52a will rotate the tool to receive the pin within the entrance slot 52b. The first upper helically inclined cam surface 52c will rotate the tool to engage the pin within the pin pocket 52d, which arrests the downward movement of the tool. Then, when the tool is raised by the cable, the first lower helically inclined cam surface 52e will cause the lower pin pocket 52f to contain the pin; whereby the actuator 2 will be raised as the cable is pulled upon and the guide pin 3 will be contained in one of the upper pockets 2a or 2b; thereby opening the device if the pin contact was changed from the shallow upper pocket 2a to the deep upper pocket 2b and closing the device if this change was from the deep pocket 2b to the shallow pocket 2a. When the cable pull is released, the second upper helically inclined cam surface 52g will rotate the tool so as to cause the exit slot 52h to pass over the pin. The tool is then free to be lowered to the next device or to be withdrawn through the device or devices above it.

In raising the tool 52 through the devices, the upper guide slopes or cam surfaces 52j will rotate the tool to receive the actuator pin 5 within the slot 52h. The second lower helically inclined cam surface 52k then contacts the actuator pin and rotates the tool slightly until the slot 52b will cause the tool to clear the pin.

It will be noted that one cable pull upon the tool 52 will change the device from open to closed, and vice versa. Manifestly, two cable pulls, spaced by a release of the tool, will enable the tool to be passed through any device; thereby leaving that device in the same position as before being pulled upon the first time. Thus the first pull changes the original condition of the device, whatever it might be, but the second pull restores the device to its original condition. Any change in the device is only temporary and of the briefest duration, if it is desired to lower the tool past a device and leave it in the condition in which it is found.

For illustration, it will be assumed that there are several devices in a well, and that the upper device is open, all other devices being closed. Now, to close the upper device and open the third device, for example, proceed as follows: Lower the operating tool 52 until it contacts the upper device and pull once. That will close the upper device. Then, lower the tool to the second device which is closed and which it is desired to leave closed. Pull upon this device twice. In doing so land the tool upon the device and pull once. Then lower the tool through it and raise the tool above it. Then lower the tool upon the device again and pull once more. Then lower the tool through the device which will leave it closed. Then land the tool upon the third device which is closed and pull once. That will open it. The tool may thereafter be withdrawn through the upper devices without stopping and without changing any one of the valve positions, as is apparent in Fig. 2.

While I have shown and referred to pin pockets in the operating tool as described, it will be understood that such pockets are employed only as a matter of nicety in finishing the tool and that they may be omitted without impairing the utility thereof.

It is apparent that the operating tool may have its ends reversed by attaching the cable upon the other end, and that the tool then will pass through successive devices without stopping as the tool is lowered. When such tool is withdrawn, each device above it will be manipulated as was described for the tool shown as it is lowered.

Any suitable means, not shown, may be provided for effecting the lowering and raising movements of the tool.

It is understood that all references to positions and directions such as "upper" and "lower," "upward" and "downward," "above" and "below" apply to the device as illustrated in the accompanying drawings and that such references are made for convenience of description only without expressed or implied limitations upon the invention or its other applications.

It is obvious that many other mechanical changes, substitutions, and adaptations may be made in the construction and that equivalents may be substituted for the parts shown; and I reserve the right to make such mechanical changes, substitutions, and adaptations within the scope of the invention as herein disclosed, as well as to apply it to various modified and other uses.

The present application is a division of my application Ser. No. 421,934 aforesaid.

What I claim is:

1. An operating tool for remotely controlled flow devices, said tool comprising: a rod-like shaft having peripheral slots thereupon, said slots forming a lower guide slope, an entrance slot communicating therewith, a first upper helically inclined cam surface opposed to said slot, an upper pin pocket at the upper end of said inclined cam surface, a first lower helically inclined cam surface opposed and in spaced relation to said pocket, a lower pin pocket at the lower end of said lower inclined cam surface, a second upper helically inclined cam surface opposed and in spaced relation to said lower pin pocket, an exit slot at the upper end of said second upper inclined cam surface, and upper guide slopes converging into said exit slot; and means for securing said shaft to a cable.

2. An operating tool for remotely controlled flow devices in the tubing of a well: a rod-like having peripheral slots thereupon, said slots forming, a lower guide slope, an entrance slot communicating therewith, a first upper helically inclined cam surface opposed to said slot, a second upper helically inclined cam surface following the first cam surface, an exit slot communicating with said second inclined cam surface, a first lower helically inclined cam surface opposed to, spaced from, and in offset relation to said upper cam surfaces, a second lower helically inclined cam surface opposed to said exit slot, spaced from, and in opposed relation to said upper cam surfaces, and upper guide slopes converging into said exit slot; and means for securing said shaft to a cable.

3. As an operating tool for remotely controlled flow devices in the tubing of a well: a rod-like shaft formed with guide slopes proximate opposite ends of said shaft, an entrance slot communicating with one of said slopes, an exit slot communicating with the other of said slopes, a first helically inclined cam surface opposed to said entrance slot, a second helically inclined cam surface opposed to said exit slot, another helically inclined cam surface in spaced and offset relation to said second cam surface, and an additional helically inclined cam surface in spaced and offset relation to said last cam surface, said opposed cam surfaces sloping in opposite directions, each two of said opposed cam surfaces and one of said slots together extending 360° around said shaft; and means at one end of said shaft for connecting said shaft to means for causing movement thereof.

4. An operating tool for remotely controlled valve means having a pin: a rod-like shaft having an enlarged portion formed at one end into a guide slope converging into a slot and adapted to engage said pin and formed into a double guide slope at the other end, each of said double guide slopes converging into another slot, there being a peripheral passage around said enlarged portion and formed into opposed inclined surfaces cooperable with said pin and adapted to rotate relative thereto for the purpose of causing said slots to pass over said pin as the tool is moved relative thereto.

ALEXANDER BOYNTON.